N. M. HOPKINS.
TACHOMETER AND ODOMETER.
APPLICATION FILED MAR. 24, 1909.

949,746.

Patented Feb. 15, 1910.

2 SHEETS—SHEET 1.

Witnesses:
C. H. Potter
N. P. Leonard

Inventor:
Nevil Monroe Hopkins,
by Rymes, Townsend & Pickerstein,
Att'ys.

N. M. HOPKINS.
TACHOMETER AND ODOMETER.
APPLICATION FILED MAR. 24, 1909.

949,746.

Patented Feb. 15, 1910.
2 SHEETS—SHEET 2.

Witnesses:
C. H. Potter
N. P. Leonard

Inventor:
Neil Monroe Hopkins,
by Byrne, Townsend & Kiustein,
Att'ys.

UNITED STATES PATENT OFFICE.

NEVIL MONROE HOPKINS, OF WASHINGTON, DISTRICT OF COLUMBIA, ASSIGNOR TO THE ELECTRIC SPEEDOMETER AND DYNAMOMETER MANUFACTURING COMPANY, OF WASHINGTON, DISTRICT OF COLUMBIA, A CORPORATION OF DELAWARE.

TACHOMETER AND ODOMETER.

949,746.  Specification of Letters Patent.  Patented Feb. 15, 1910.

Application filed March 24, 1909. Serial No. 485,470.

*To all whom it may concern:*

Be it known that I, NEVIL MONROE HOPKINS, a citizen of the United States, residing at Washington, in the District of Columbia, have invented certain new and useful Improvements in Tachometers and Odometers, of which the following is a specification.

This invention relates to an electric tachometer and odometer especially designed for use on automobiles, comprising a direct-current magneto driven by gears from one of the automobile wheels, a milli-volt-meter connected with the magneto and having a scale calibrated to indicate speed in distance-units per time-unit, and an odometer driven by the shaft which drives the magneto.

The invention comprises certain improvements which are hereinafter described and specifically claimed.

Figure 1:
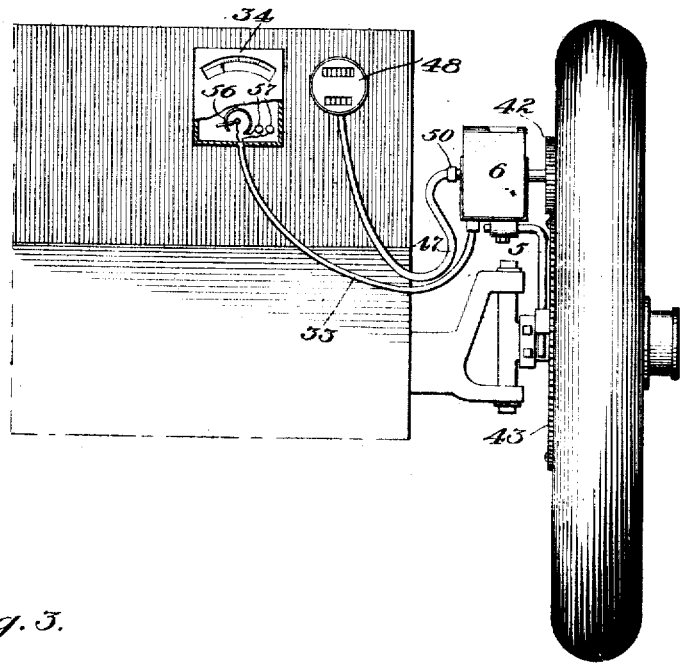
Figure 3:
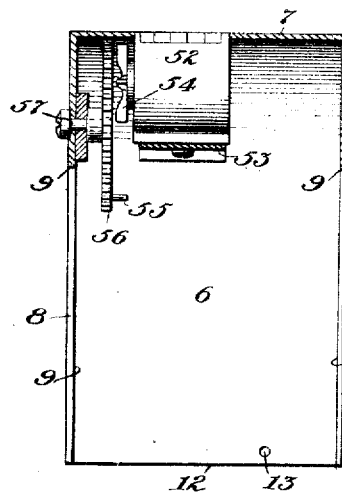
Figure 2:
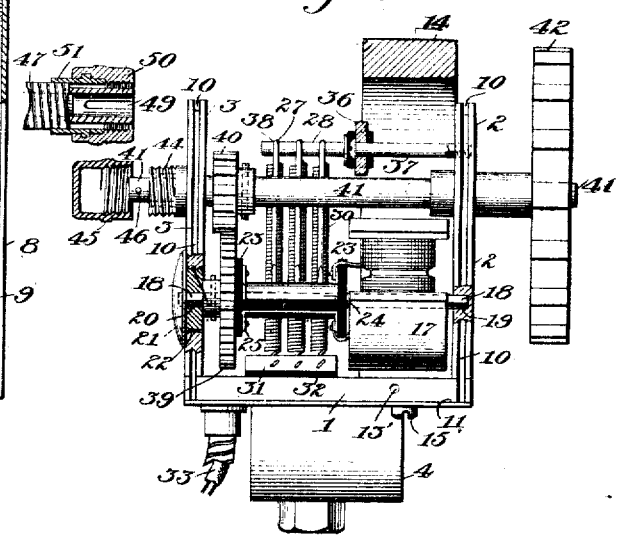
Figure 4:
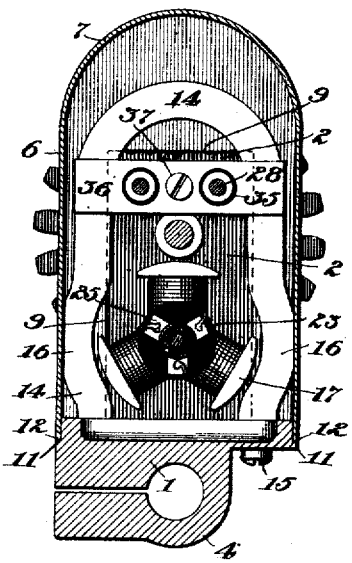
Figure 5:
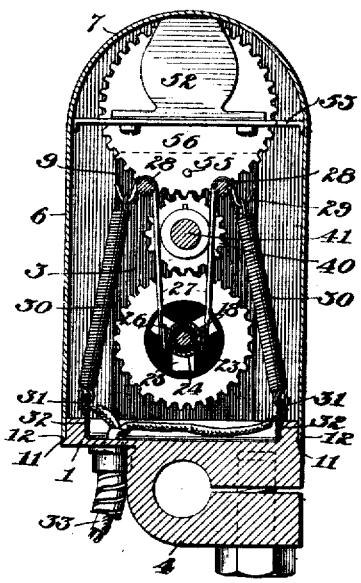

Referring to the accompanying drawing:—Figure 1 is a rear elevation showing the magneto carried by the steering-knuckle of an automobile and connected to speed and distance meters mounted on the dash board; Fig. 2 is a sectional side elevation of the magneto, with its cover removed; Fig. 3 is a longitudinal vertical section of the magneto cover, carrying an odometer; Fig. 4 is a sectional elevation of the magneto on a plane normal to its shafts, looking toward its magnet; and Fig. 5 is a similar sectional elevation of the magneto, looking in the opposite direction.

The mechanism of the magneto, which is constructed to deliver direct currents, is carried by a horizontal base-plate 1 and vertical end-plates 2, 3, integral with the base. An integral apertured lug 4 extends downward from the base, receiving the arm of a bent standard 5 which supports the magneto on one of the steering-knuckles of an automobile. The mechanism of the magneto is inclosed by a removable cover 6 having a curved top 7. Rectangular vertical open slots 8 are cut in the ends of the cover, leaving marginal flanges 9 which enter and make a substantial water- and dust-proof joint with grooves 10 in the side-edges and top of the end-plates 2, 3. When the cover is slid into place, its lower edge 12 seats on a flange 11 projecting from the lower edge of the base-plate 1, and it is secured in this position by a screw entering alined holes 13, 13′ in the cover and base-plate.

The ends of a vertical horseshoe magnet 14 are secured on the base-plate 1, receiving screws 15 which pass through this plate into them. The polar extremities of the magnet are bent into arcs 16, to provide a magnetic field within which rotates the armature 17, here shown as tri-polar. It is desirable that the armature should have more than two poles in order that the commutator speed may be fairly low, it being impossible to effectively commutate current when the speed of the commutator-segments relative to the brushes exceeds a certain figure, say one mile per minute, especially with currents of low potential. The armature is carried by a shaft 18, one end of which is journaled in a hole 19 drilled into but not through the end-plate 2, while the other end is journaled in a hole 20 drilled into but not through a plug 21 which is threaded into an opening 22 in the other end-plate 3.

The commutator comprises a spool 23 of insulating material, *e. g.* vulcanite, driven onto the shaft 18, and three strips 24 of an inoxidizable fairly hard metal or alloy, *e. g.* platinum or platinum-iridium, the ends 25 of which are bent outward at right angles to lie against the ends of the spool 23 and are riveted thereto. The three leads from the armature windings are soldered to one end of these strips. The brushes 26 consist of an inoxidizable metal or alloy which is preferably softer than that of the strips 24, *e. g.* gold, so that the wear due to friction will largely be on the brushes, which are easily renewed. Each brush is carried by a spring-wire 27, which is bent and hung on a horizontal support 28. The free end of each wire is bent into a hook 29, receiving an eye at one end of a coiled tension-spring 30, the other end of which is soldered to a horizontal metal strip 31 carried by an insulating strip 32 which is riveted to the base-plate 1. To the strips 31 are respectively secured the two wires of a cable 33 which delivers electric current to the speed meter 34. The brush-supports 28 are metal rods, secured at one end in the insulating bushings 35, fixed in a metal bar 36 which is clamped against the outer face of the magnet 14 by a screw 37 threaded into the vertical plate 2. This bar not only carries the brushes but clamps the magnet firmly against the end-plate 2. Each support 28 has annular grooves 38 to receive the bent portions of the brush-wires 27.

The armature is driven by a gear 39 pinned onto the shaft 18, which meshes with a smaller gear 40 pinned on an upper shaft 41, the ends of which pass through and are journaled in openings in the vertical plates 2, 3. One end of shaft 41 receives a pinion 42 which meshes with a gear 43 fixed on the automobile wheel. The other end of the shaft 41 passes through a threaded boss 44 on the outer side of plate 3, which may receive a cap 45. By interposing the reduction gears 39, 40 between the commutator-shaft 18 and the driving-shaft 41, the speed of the commutator-segments relative to the brushes may be reduced to a figure which enables the weak low-tension currents generated by this magneto to be successfully commutated, employing segments and brushes of inoxidizable precious metals or alloys. The teeth of the gears 43, 42 which transmit power from the vehicle-wheel to the driving-shaft 41 are necessarily coarse or of large pitch, and the teeth of the gear 43 strike intermittent heavy or hammer-like blows on the teeth of the gear 42, so that it is impracticable to directly employ the shaft 41 as the armature- and commutator-shaft of the magneto. The gears 40, 39 connecting the driving-shaft 41 and the magneto-shaft are, however, comparatively fine, or of small pitch relative to those of the external gears, so that the armature-shaft is given a smooth and uniform rotation without vibration or chattering. By reason of the relative fineness of the teeth of the internal gears, it is necessary that these gears should be protected from the dust and grit of the road, that is, that they should be inclosed in the substantially water- and dust-proof case.

By removing the cap 45, the shaft 41 may be coupled by a pin 46 to a flexible shaft 47 leading to an odometer 48 mounted on the dash-board of the automobile. The pin 46 then enters a slot 49 in the end of the flexible shaft, a threaded sleeve 50 swiveled on a coupling 51 soldered on the end of the casing of the flexible shaft being then screwed onto the threaded boss 44. Another odometer 52 is permanently mounted in the curved top 7 of the magneto case, being carried by a transverse bar 53. This odometer has a star-wheel 54 which is engaged by a pin 55 projecting from a gear 56 which is journaled on a stud 57, secured in one end of the case 6. When this case is slid into position upon the magneto, the gear 56 engages with the gear 40 on the driving-shaft 41.

The case of the milli-volt-meter 34 contains a variable resistance 56, interposed in the circuit between the magneto and the terminals 57 of the meter-winding, by which the meter may be accurately calibrated, so that the same speed-scale may be employed in all meters, notwithstanding small differences in the electric current fed to them by different dynamos, or in the torque thereby produced in each instrument.

By the specified construction, I am enabled to successfully employ a direct-current low-tension magneto and a milli-volt meter or milli-ampmeter to indicate the speed of an automobile, something which has heretofore been deemed impossible on account of the difficulty in commutating the very weak current developed, and the high commutator speed which would exist if the armature were carried by a shaft directly driven by the pinion engaging the gear on the automobile-wheel. The use of commutator-segments and brushes of inoxidizable precious metals or alloys of different hardness enables me to provide a commutator of invariable resistance, the worn brushes of which may be readily renewed at small expense.

The term "vehicle," as used in the claims, is intended to include land, water and aerial conveyances.

I claim:

1. In a tachometer consisting of a direct-current magneto having a commutator and an electric meter in circuit therewith, the combination with the magneto of a substantially water- and dust-proof case therefor, a shaft extending through said case and adapted to be driven at high speed, and reduction gears in said case between said shaft and the magneto commutator-shaft.

2. In a vehicle tachometer consisting of a direct-current magneto having a commutator and an electric meter in circuit therewith, the combination with the magneto of a substantially water- and dust-proof case therefor, a shaft extending through said case, a pinion on the outer end of said shaft, a gear adapted to be carried by a vehicle wheel and mesh with said pinion, and reduction gears in said case between said shaft and the magneto commutator-shaft.

3. In a vehicle tachometer consisting of a direct-current magneto and an electric meter in circuit therewith, the combination with the magneto of a substantially water- and dust-proof case therefor, a shaft extending through said case and having a pinion adapted to mesh with a gear on a vehicle-wheel, and gears in said case between said shaft and the magneto commutator-shaft, having teeth of smaller pitch than those of said pinion.

4. In a vehicle tachometer consisting of a direct-current magneto and an electric meter in circuit therewith, the combination with the magneto of a substantially water- and dust-proof case therefor, consisting of a base-plate, end-plates integral therewith, and a removable cover, the field-magnet of the magneto being screwed to said base and clamped to one end-plate, a shaft extending through said case and adapted to be driven by the vehicle, and gears in said case between said shaft and the armature-shaft.

5. In a vehicle tachometer consisting of a direct-current magneto having a commutator and brushes and an electric meter in circuit therewith, the combination with the magneto of a substantially water- and dust-proof case therefor, consisting of a base-plate, end-plates integral therewith, and a removable cover, the field-magnet of the magneto being screwed to said base, means for clamping said magnet to one end-plate and for supporting the commutator-brushes, a shaft extending through said case and adapted to be driven by the vehicle, and gears in said case between said shaft and the armature-shaft.

6. In a vehicle tachometer consisting of a direct-current magneto and an electric meter in circuit therewith, the combination with the magneto of a substantially water- and dust-proof case therefor consisting of a base-plate, end-plates having marginal grooves, and a removable cover having recesses receiving said end-plates and marginal flanges which enter said grooves, a shaft extending through said case and adapted to be driven by the vehicle, and gears in said case between said shaft and the armature-shaft.

7. In a vehicle tachometer consisting of a direct-current magneto and an electric meter in circuit therewith, the combination with the magneto of a substantially water- and dust-proof case therefor consisting of a flanged base-plate, end-plates having marginal grooves, and a removable cover having recesses receiving said end-plates, marginal flanges which enter said grooves, and lower edges which seat against the base-flanges, a shaft extending through said case and adapted to be driven by the vehicle, and gears in said case between said shaft and the armature-shaft.

8. In a vehicle tachometer consisting of a direct-current magneto and an electric meter in circuit therewith, the combination with the magneto of a case therefor consisting of a base-plate, end-plates, and a removable cover, a driving shaft journaled in said end-plates, extending through said case, and adapted to be driven by the vehicle, gears in said case between said shaft and the armature-shaft, and an odometer gear carried by said cover and detachably geared to said driving-shaft.

9. In a vehicle tachometer consisting of a direct-current magneto and an electric meter in circuit therewith, the combination with the magneto of a case therefor consisting of a base-plate, end-plates, and a removable cover, one end-plate having an opening, a plug removably secured in said opening, a shaft extending through said case and adapted to be driven by the vehicle, an armature-shaft journaled at one end in said plug and at the other end in the other end-plate, and gears in said case between the driving-shaft and the armature-shaft.

In testimony whereof, I affix my signature in presence of two witnesses.

NEVIL MONROE HOPKINS

Witnesses:
 EUGENE A. BYRNES,
 JOS. H. BLACKFORD.